United States Patent
Webb

(10) Patent No.: US 8,482,611 B2
(45) Date of Patent: Jul. 9, 2013

(54) SURVEILLANCE CAMERA

(75) Inventor: Clifford Webb, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 468 days.

(21) Appl. No.: 12/730,100

(22) Filed: Mar. 23, 2010

(65) Prior Publication Data

US 2011/0234792 A1 Sep. 29, 2011

(51) Int. Cl.
*H04N 9/47* (2006.01)

(52) U.S. Cl.
USPC .......................................... 348/151; 348/143

(58) Field of Classification Search
USPC ................... 348/143, 374, 375, 151
See application file for complete search history.

(56) References Cited

U.S. PATENT DOCUMENTS

| | | | |
|---|---|---|---|
| 5,453,753 A * | 9/1995 | Cosenza et al. ............ 343/765 |
| 5,791,903 A | 8/1998 | Feuer et al. |
| 5,805,115 A * | 9/1998 | Pellerin et al. ............. 343/763 |
| 5,934,911 A * | 8/1999 | Stout et al. ................. 439/21 |
| 6,089,875 A * | 7/2000 | Iwata et al. ................. 439/26 |
| 6,437,656 B1 * | 8/2002 | Guynn et al. ............... 333/24 R |
| 6,628,338 B1 * | 9/2003 | Elberbaum et al. ........ 348/373 |
| 6,768,233 B2 * | 7/2004 | Angerpointner ............ 310/68 R |
| 6,793,415 B2 * | 9/2004 | Arbuckle .................... 396/427 |
| 7,249,992 B2 * | 7/2007 | Kalenian et al. ............ 451/11 |
| 7,667,769 B2 * | 2/2010 | Gao et al. .................... 348/374 |
| 8,120,228 B2 * | 2/2012 | Carvalho ..................... 310/232 |
| 8,139,205 B2 * | 3/2012 | McKaughan et al. ....... 356/5.01 |
| 2004/0169434 A1 * | 9/2004 | Washington et al. ......... 310/232 |
| 2006/0251188 A1 * | 11/2006 | Crawley et al. ............. 375/319 |
| 2007/0220741 A1 * | 9/2007 | Gieskes et al. .............. 29/739 |
| 2007/0230451 A1 | 10/2007 | Porat et al. |

* cited by examiner

*Primary Examiner* — John Follansbee
*Assistant Examiner* — Madhu Woolcock
(74) *Attorney, Agent, or Firm* — Hamilton, Brook, Smith & Reynolds, P.C.

(57) ABSTRACT

A surveillance camera includes a slip ring having electrical connections for Ethernet protocol signals and a RF reference plane. A first circuit is located on a rotating portion of the surveillance camera and electrically connected to the camera for compressing signals generated by the camera and for converting the signals generated by the camera to Ethernet protocol signals. The slip ring has a stationary portion and a rotating portion, each with a corresponding plurality of electrical connection. An RF reference plane is located on the stationary portion of the surveillance camera and electrically connected to a first subset of the plurality of electrical connections of the stationary portion of the slip ring. A second subset of the plurality of electrical connections of the stationary portion of the slip ring conducts the Ethernet protocol signals and is arranged in alternation with each electrical connection of said first subset.

7 Claims, 4 Drawing Sheets

SURVEILLANCE CAMERA

CROSS-REFERENCE TO RELATED APPLICATION

N/A

STATEMENT REGARDING FEDERALLY SPONSORED RESEARCH OR DEVELOPMENT

N/A

BACKGROUND OF THE INVENTION

This invention relates to surveillance systems and, in particular, to a movable surveillance camera capable of utilizing fast Ethernet signals in a video surveillance system.

Surveillance systems often include movable cameras, which are referred to in the industry as pan/tilt/zoom cameras or PTZ cameras. The PTZ cameras employ circuitry and drive mechanisms for panning, tilting, and zooming the camera. A surveillance camera assembly with 360 degree pan motion requires a rotational joint that can conduct electrical power and signals between the camera on the rotating structure and the electronics on the stationary structure. Typical designs use a slip ring to realize this power/signal rotational joint. Such slip rings have generally been used in movable analog camera assemblies to transmit the analog video signals across the slip ring. With the inclusion of higher resolution cameras, such as high-definition cameras, and Ethernet signals in particular, fast Ethernet signals, such as 100BASE-T, there has arisen a need for a surveillance camera configuration that allows the use of higher resolution cameras in PTZ domes with 360 degree panning. When prior art movable cameras employing slip rings attempt to use high definition cameras and fast Ethernet signals, they generally suffer from increased bit errors, crosstalk, and even total loss of signal. Accordingly, an improved camera assembly is necessary to meet the high quality and reliability requirements of modern video surveillance systems.

SUMMARY OF THE INVENTION

In accordance with the present invention there is provided a surveillance camera having a stationary portion and a rotating portion and comprising a camera located on the rotating portion of the surveillance camera for generating signals indicative of a scene in a field of view of the camera, a first circuit located on the rotating portion of the surveillance camera and electrically connected to the camera for compressing the signals generated by the camera and for converting the signals generated by the camera to Ethernet protocol signals, a slip ring having a stationary portion with a plurality of electrical connections and a rotating portion with a plurality of electrical connections corresponding with the plurality of electrical connections on the stationary portion, the first circuit being electrically connected to a first subset of the plurality of electrical connections of the rotating portion of the slip ring, an RF reference plane located on the stationary portion of the surveillance camera and electrically connected to a first subset of the plurality of electrical connections of the stationary portion of the slip ring at RF frequencies; and a second subset of the plurality of electrical connections of the stationary portion of the slip ring being selected for conducting Ethernet protocol signals, wherein each of the second subset of the plurality of electrical connections of the stationary portion of the slip ring has a first side and a second side and a first one of the first subset of the plurality of electrical connections of the stationary portion of the slip ring is located adjacent to the first side and a second one of the first subset of the plurality of electrical connections of the stationary portion of the slip ring is located adjacent to the second side.

The present invention enables the use of a slip ring in a 360 degree full rotation pan/tilt/zoom (PTZ) camera to conduct the two differential signals in a 100BASE-T Ethernet transmission line with the use of only nine slip ring pins. The Ethernet transmission structure uses nine pins on nine sequential rings. Four pins carry the dual differential 100BASE-T Ethernet signal pairs. The remaining five pins of the set are used for RF reference plane lines that are associated with the RF ground plane of the design. The five RF reference plane lines are used to eliminate crosstalk issues between the Ethernet lines, provide a structure which minimizes impedance mismatching, and includes series resistive damping elements to dissipate RF energy trapped in the ring structure, which lowers the quality factor or Q factor of ringing on the data bits in the 100BASE-T data stream. This technique maximizes the signal integrity of the Ethernet stream, and provides minimum bit error rate issues in the slip ring 100BASE-T Ethernet communication path. This invention allows dual purpose use of the five RF reference plane slip ring lines, such that all five can also carry DC power and low frequency signals, which decreases the number of slip ring rings required in any given design. This invention allows the video signal to be compressed on the rotating structure before it reaches the slip ring. Decreasing the bandwidth of the video information crossing slip ring, by compression on the rotating structure, allows the use of low bandwidth, low cost slip ring parts in the design, with no limit to the camera video resolution as long as the bandwidth of the compressed video does not exceed Ethernet 100BASE-T capability.

Other advantages and applications of the present invention will be made apparent by the following detailed description of the preferred embodiment of the invention.

DETAILED DESCRIPTION OF THE INVENTION

Figure 1:
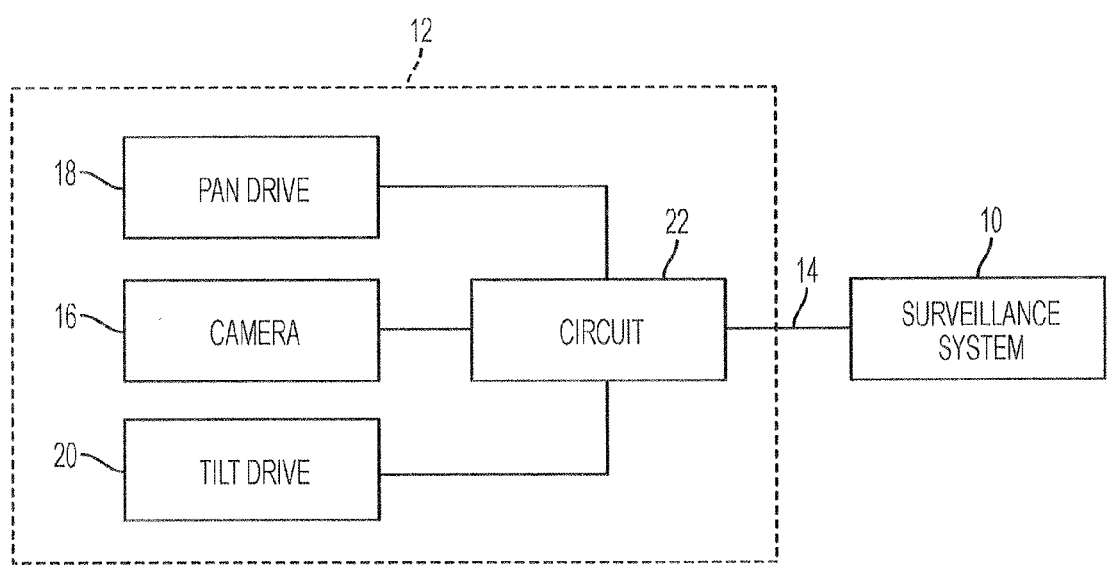
FIG. 1 is a block diagram of a video surveillance system utilizing the present invention.

Referring to FIG. 1, a video surveillance system 10 is connected to surveillance camera 12 by communication line 14, which can be, for example, an Ethernet cable such as Category 5 (CAT5) running 100BASE-T over four wires arranged in two twisted pairs of the CAT5 cable with, for example, one pair for transmitting control signals from surveillance system 10 to surveillance camera 12 and the other pair for receiving video signals from surveillance camera 12.

Surveillance camera 12 has a camera 16, which can be a mega pixel camera having a high definition of, for example, 720 p or 1080 p. Surveillance camera 12 can be a PTZ type camera with pan drive 18 for rotating surveillance camera 12 in a horizontal plane and tilt drive 20 for moving surveillance camera 12 in a vertical plane. Circuit 22 controls pan drive 18 and tilt drive 20 based on control signals provided by surveillance system 10 over communication line 14 as is know in the art. Circuit 22 performs various other functions as discussed hereinbelow.

Figure 2:
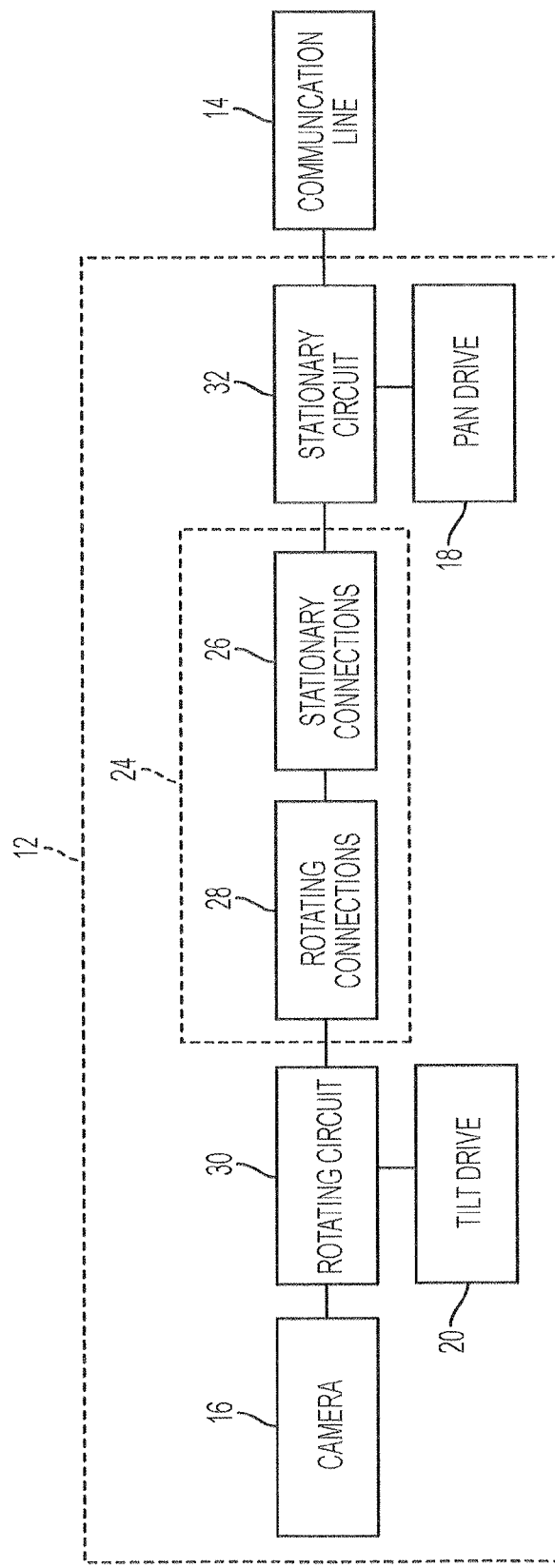
FIG. 2 is a block diagram of an exemplary surveillance camera shown in FIG. 1.

FIG. 2 shows a block diagram of surveillance camera 12 utilizing a slip ring 24, which allows 360 degree rotation of camera 16. Slip ring 24 has a stationary portion with stationary electrical connections 26 and a rotating portion with rotating electrical connections 28 that are electrically connected to stationary connections 26 by rings and brushes as is known in the art. Camera 16 is connected to rotating circuit 30, which, in turn, is connected to rotating connections 28. Stationary circuit 32 is connected to stationary connections 26 and communication line 14. Although communication line 14 is shown as being connected to stationary circuit 26, some or all of the lines in communication line 14 can go directly to stationary connections 26. Tilt drive 20 is connected to rotating circuit 30, and pan drive 18 is connected to stationary circuit 32.

Figure 3:
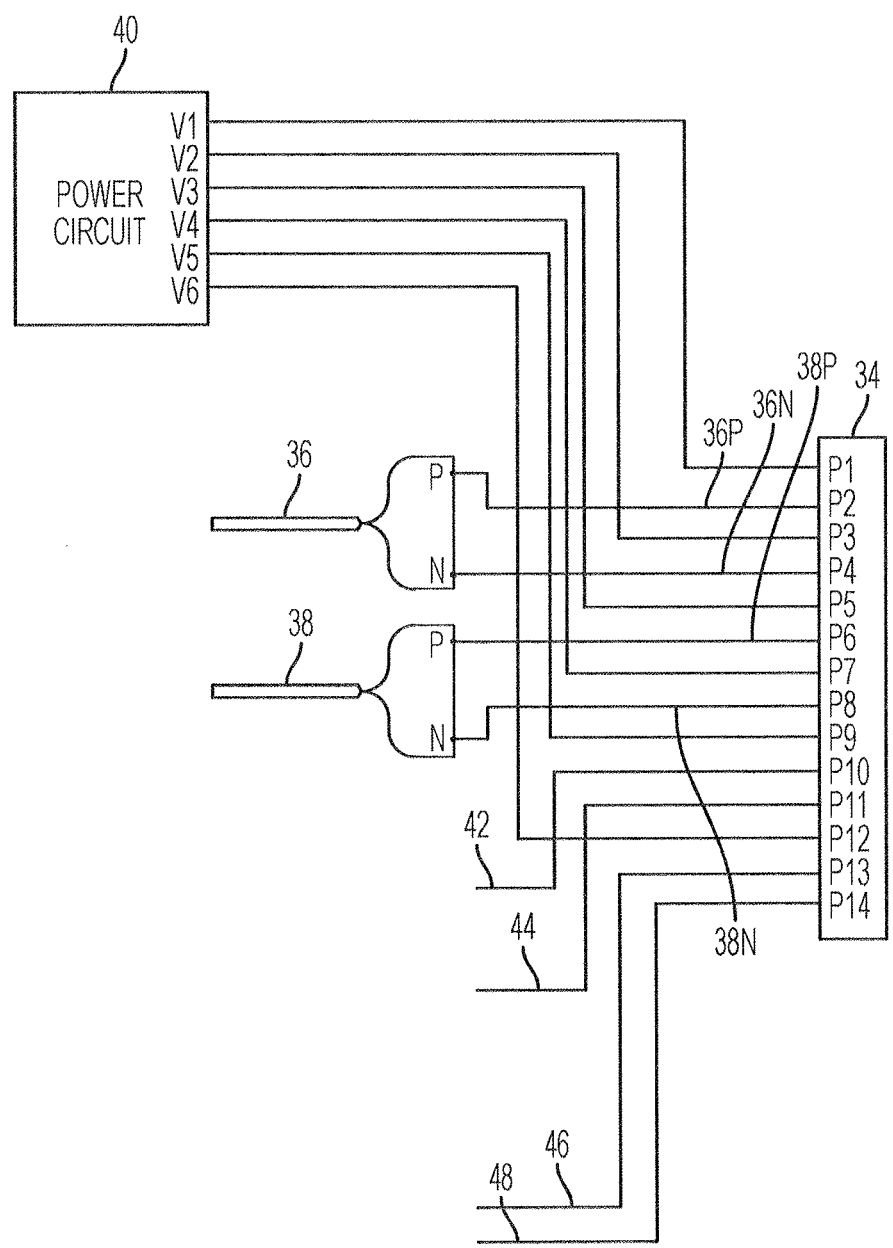
FIG. 3 is a block diagram of one embodiment of a slip ring utilizing the present invention.

One embodiment of the stationary side of slip ring 24 is shown in FIG. 3. Block 34 illustrates the stationary connectors of slip ring 24 with fourteen separate connection points labeled P1 through P14. The number of connection points may vary depending upon the additional features included. Nine of the fourteen connection points are used in this embodiment of the Ethernet implementation. Connection points P2 and P4 are connected respectively to lines 36P and 36N of a first twisted pair 36 of a CAT5 or other suitable cable. Similarly, connection points P6 and P8 are connected respectively to lines 38P and 38N of a second twisted pair 38. One of twist pairs 36 and 38 is used for transmitting Ethernet 100BASE-T protocol signals and the other twist pair is used of receiving Ethernet 100BASE-T protocol signals. Connection points P1, P3, P5, P7, and P9 are connected respectively to power rails V1, V2, V3, V4, and V5 in power circuit 40, which is part of stationary circuit 32. The respective power rails may be different voltages utilized in camera 16, rotating circuit 30 and tilt drive 20, or two or more of the power rails may be the same voltage. The voltage can range from zero to the maximum voltage in camera 12. Power rails V1-V5 provide RF reference plane lines to eliminate crosstalk issues between the Ethernet data signals and other signals on the slip ring, as well as eliminating crosstalk issues between the Ethernet signals themselves. Each of the power rails could be equal, such as ground potential; however, then additional rings would be required in the slip ring to provide the connection points for the various voltages needed on the rotating side of surveillance camera 12. To minimize the number of slip ring rings/pins required in a design, the five RF reference plane lines can also carry DC power and low frequency data signals as discussed below.

Line 42 connected to connection point P10 and line 44 connected to connection point P11 allow communication with various accessories such as alarms, relays, and audio devices by, for example, by universal serial bus (USB) protocol. Line 46 connected to connection point P13 and line 48 connected to connection point P14 can be used with a universal asynchronous receiver/transmitter (UART) for communications across the slip ring between the stationary and rotating circuit boards. The major portion of processing power in surveillance camera 12 is located on the rotating side. Control signals are transmitted to surveillance camera 12 through the Ethernet cable and passed through the slip ring to the main processor on the rotating board. Control signals, for example, that control the panning motor on the stationary side of surveillance camera 12, are then passed back over the UART connection on the slip ring to the stationary circuit board. Having the majority of the processing power in one location reduces the overall cost of manufacturing.

Figure 4:
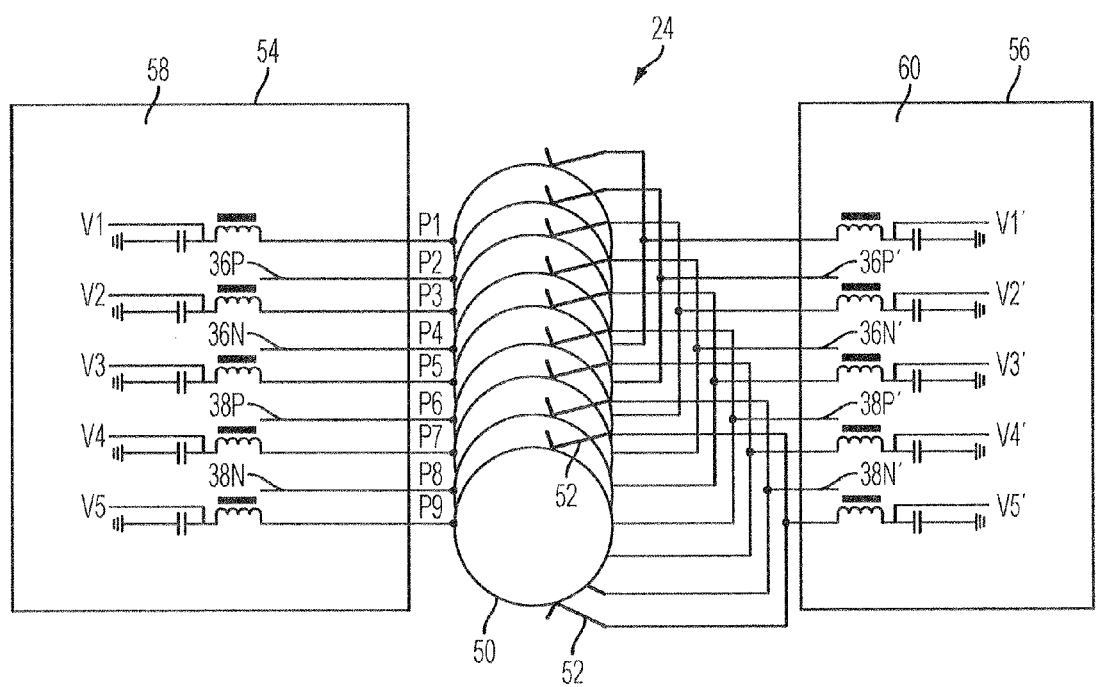
FIG. 4 is a schematic diagram of one embodiment of a slip ring utilizing the present invention.

FIG. 4 illustrates one embodiment of an implementation of the present invention. Nine rings of slip ring 24 is illustrated by a plurality of rings 50, labeled as connection points P1, P3, P5, P7, and P9, are respectively connected to power rails V1, V2, V3, V4, and V5 on stationary side 54 as discussed in relation to FIG. 3 and a corresponding plurality of sets of two connectors or brushes 52 contacting rings 50 and being connected to rotating side 56 and having power rails V1', V2', V3', V4', and V5' respectively on rotating side 56. Stationary side 54 has an RF reference plane 58 associated with stationary circuit 32, and rotating side 56 has an RF reference plane 60 associated with rotating circuit 30. Power rails V1-V5 and V1'-V5" provide a link between RF reference plane 58 and RF reference plane 60. Lines 36P, 36N, 38P, and 38N are connected to P2, P4, P6, and P8 as discussed in relation to FIG. 3. Slip ring 24 has corresponding lines on the rotating side, namely, 36P', 36N', 38P', and 38N'. Each leg on stationary side 54 has a ferrite coil and a capacitor connected in series between the connection point of slip ring 24 and RF reference plane 58 and the respective power rail connection located between the series connection of the ferrite coil and capacitor. Similarly, each leg on rotating side 56 has a ferrite coil and a capacitor connected in series between the connection point of slip ring 24 and RF reference plane 60 and the respective power rail connection located between the series connection of the ferrite coil and capacitor. The capacitor in each leg isolates the DC voltage from respective power rail from the RE reference plane. However, in the case of the high frequency RF noise signals, the power rail is connected to the RF reference plane and the ferrite presents a large impedance to dampen the high frequency signals.

The Internet Protocol (IP) PTZ camera of the present invention needs to process large bandwidth video data coming from the camera on the rotating structure and transmit that data over 100BASE-T Ethernet to the stationary structure. The video data from the camera is compressed before it is transmitted on the 100 BASE-T Ethernet connection, which lowers the bandwidth requirements over the Ethernet connection. By placing the video compression electronics on the rotating structure, the bandwidth requirement of the slip ring communication link is reduced. This strategy requires sending the compressed video data through the slip ring as Ethernet packets on a 100BASE-T Ethernet transmission line, which has a power spectrum of energy up to 100 MHz. The 100base-T Ethernet signals transmitted across the slip ring configuration of the present invention allows 720 p, 1080 p or higher signals since they can be compressed to 100 Mbit Ethernet signals.

The present invention conducts the data with the required signal integrity for 100BASE-T Ethernet. There are several issues created by sending Ethernet over a slip ring. The slip ring introduces an impedance mismatch with the 100 ohm Ethernet differential line, causing ringing on the signal pulses. This can cause an increase in bit errors, or total loss of communication. In addition, crosstalk occurs between other signals on the slip ring and the two differential Ethernet signals, or between the two differential Ethernet signals themselves. This crosstalk can cause an increase in bit errors, or total loss of communication. Still further, the rings in the slip ring structure form a resonant cavity with multiple resonant frequencies. RF energy from each data bit in the data stream becomes trapped in the slip ring, energizing the resonant cavity to ring in the various resonant modes. As this trapped energy slowly leaks out of the cavity it causes bit smearing, as some bit energy now reaches the Ethernet receiver one or more bit periods after the bit position in which it was originally created. This smearing of bits increases the bit error rate in the communication path. The quality factor or Q factor of the resonant cavity is related to how large the impedance mismatches are in the ring structure. A larger impedance mismatches causes a higher Q factor, allowing the energy to ring longer with more bit smearing. The resonant frequencies of the cavity depend on the size of the ring structure. Smaller structures have higher resonant frequencies.

The present invention minimizes the impact of the ring resonant cavity, while decoupling the various signals from each other to minimize crosstalk. The structure is implemented on nine sequential rings of the slip ring. Four rings carry the Ethernet data signals. The remaining five rings provide damped RF reference plane lines. The reference plane lines in the present invention shield the crosstalk between the Ethernet lines inside the slip ring and also link the RF reference plane of the rotating circuit board with the RF reference plane of the stationary board. If the slip ring has more than nine rings, other data and power lines can be transmitted across the slip ring above or below this structure. The damping in the five ground reference lines burns up the RF energy trapped in the ring structure resonant cavity, lowering the Q of the resonant chamber, which quickly damps out the ringing on the Ethernet data pulses, which eliminates bit smearing. The damping elements in the RF reference plane lines can be surface mount ferrite devices. The ferrites offer a pseudo-zero Ohm path for DC power and low frequency signals, but provide a high impedance element for the high frequency RF signals. This dual purpose feature allows greater utilization of the five RF reference plane rings, thereby allowing the design to have a lower number of rings overall.

All of the reference planes could be set at the same voltage, for example, zero volts or some other value. By using the various DC power supply voltages that are necessary for operating the camera, tilt motor and processing circuitry for processing and compressing the video image from the camera, the alternating reference planes serve two purposes. The dual purpose allows the use of fewer pins, which results in a cost savings since the cost of the slip ring is proportional to the number of pins in the slip ring. The size of the slip ring is important because the smaller it is the higher the frequency of the signals that can be transmitted through the slip ring. The slip rings normally used in video surveillance domes contain two brushes for redundancy to insure that at least one of them is in contact with the respective ring of the rotor. When a signal is transmitted into the slip ring, the RF energy passes around the ring in both directions. A larger slip ring, i.e., one with more pins, requires more time for the signals to travel around the slip ring, than a smaller slip ring.

Damping is needed on each side of the slip ring, i.e., the rotor and the stator sides. The ferrite core coil device is needed to provide the dual purpose for each pin of the reference planes. In an alternative embodiment, a resistor could be used if there was no DC voltage supplied on the pin. The ferrite core coil device has a resistance of essentially zero for a DC signal, but it acts like a resistor at high frequencies. The resistive component does the damping of the ringing and transient signals in the slip ring. The ferrite coil burns off ringing caused by splitting of digital signal within the slip ring, since a ferrite is a super lossy inductor. The capacitor provides the isolation of the DC voltage on the reference plane from the ground plane. If a DC voltage is not implemented then only the resistor connected to RF reference plane is needed. In this case the resistor provides the damping effect.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A surveillance camera having a stationary portion and a rotating portion and comprising:
    a camera located on said rotating portion of said surveillance camera for generating signals indicative of a scene in a field of view of said camera;
    a first circuit located on said rotating portion of said surveillance camera and electrically connected to said camera for compressing said signals generated by said camera and for converting said signals generated by said camera to Ethernet protocol signals;
    a slip ring having a stationary portion with a plurality of electrical connections and a rotating portion with a plurality of electrical connections corresponding with said plurality of electrical connections on said stationary portion of said slip ring, said first circuit being electrically connected to a first subset of said plurality of electrical connections of said rotating portion of said slip ring and to a second subset of said plurality of electrical connections of said rotating portion of said slip ring selected for conducting Ethernet protocol signals;
    an RF reference plane located on said stationary portion of said surveillance camera and electrically connected to a first subset of said plurality of electrical connections of said stationary portion of said slip ring at RF frequencies;
    and a second subset of said plurality of electrical connections of said stationary portion of said slip ring selected for conducting Ethernet protocol signals, wherein each electrical connection of said second subset of said plurality of electrical connections of said stationary portion of said slip ring is arranged in alternation with each electrical connection of said first subset of said plurality of electrical connections of said stationary portion of said slip ring.

2. A surveillance camera as recited in claim 1 wherein the RF reference plane located on the stationary portion of said surveillance camera is a stationary RF reference plane and further comprising a rotating RF reference plane located on said rotating portion of said surveillance camera, and wherein said first subset of said plurality of electrical connections on said rotating portion of said slip ring corresponds to said first subset of said plurality of electrical connections on said stationary portion of said slip ring, said first subset of said plurality of electrical connections on said rotating portion of said slip ring being connected to said rotating RF reference plane located on said rotating portion of said surveillance camera at RF frequencies.

3. A surveillance camera as recited in claim 2 wherein said surveillance camera further comprises a ferrite coil connected between said slip ring and a respective said stationary RF reference plane or said rotating RF reference plane.

4. A surveillance camera as recited in claim 3 wherein said surveillance camera comprises a ferrite coil in each electrical connection in said first subset of said plurality of electrical connections of said stationary portion of said slip ring and in each electrical connection in said first subset of said plurality of electrical connections of said rotating portion of said slip ring.

5. A surveillance camera as recited in claim 2 wherein said first subset of said plurality of electrical connections of said stationary portion of said slip ring are connected to a DC power supply.

6. A surveillance camera as recited in claim 4 wherein said first subset of said plurality of electrical connections of said stationary portion of said slip ring are connected to a DC power supply.

7. A surveillance camera as recited in claim 6 wherein said each of said ferrite coils is connected to a respective capacitor at a respective junction corresponding to said electrical connections of said first subset of said plurality of electrical connections of said stationary portion of said slip ring or said second subset of said plurality of electrical connections of said stationary portion of said slip ring, said respective capacitors are connected to a respective said stationary RF reference plane or said rotating RF reference plane and wherein said DC power supply comprises a plurality of rails, said plurality of rails being respectively connected between the respective ferrite coil and capacitor at the respective junction.

* * * * *